July 11, 1961
C. S. BLOCK
2,991,550
METAL FOIL COATED WITH DIELECTRIC
MATERIAL AND METHOD OF FORMING
Filed May 25, 1956
2 Sheets-Sheet 2
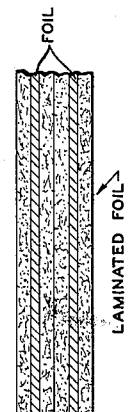
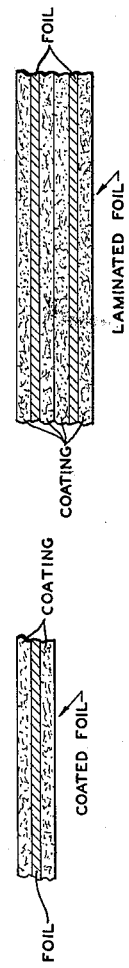
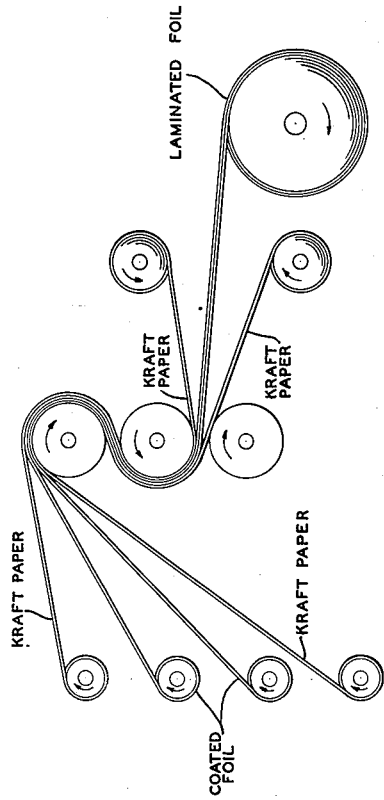
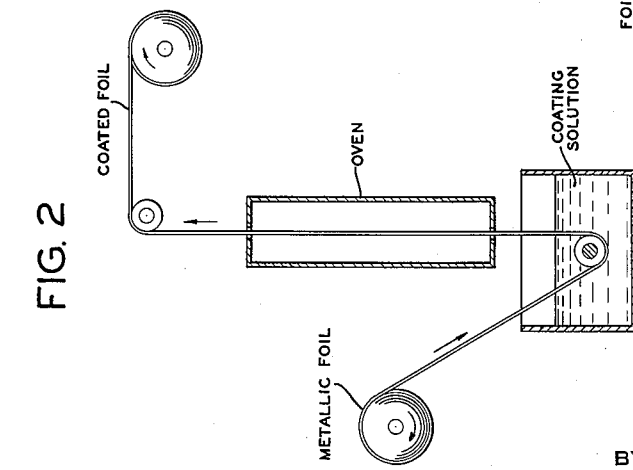
INVENTOR
CHARLES S. BLOCK
BY
ATTORNEY 2,991,550
Patented July 11, 1961

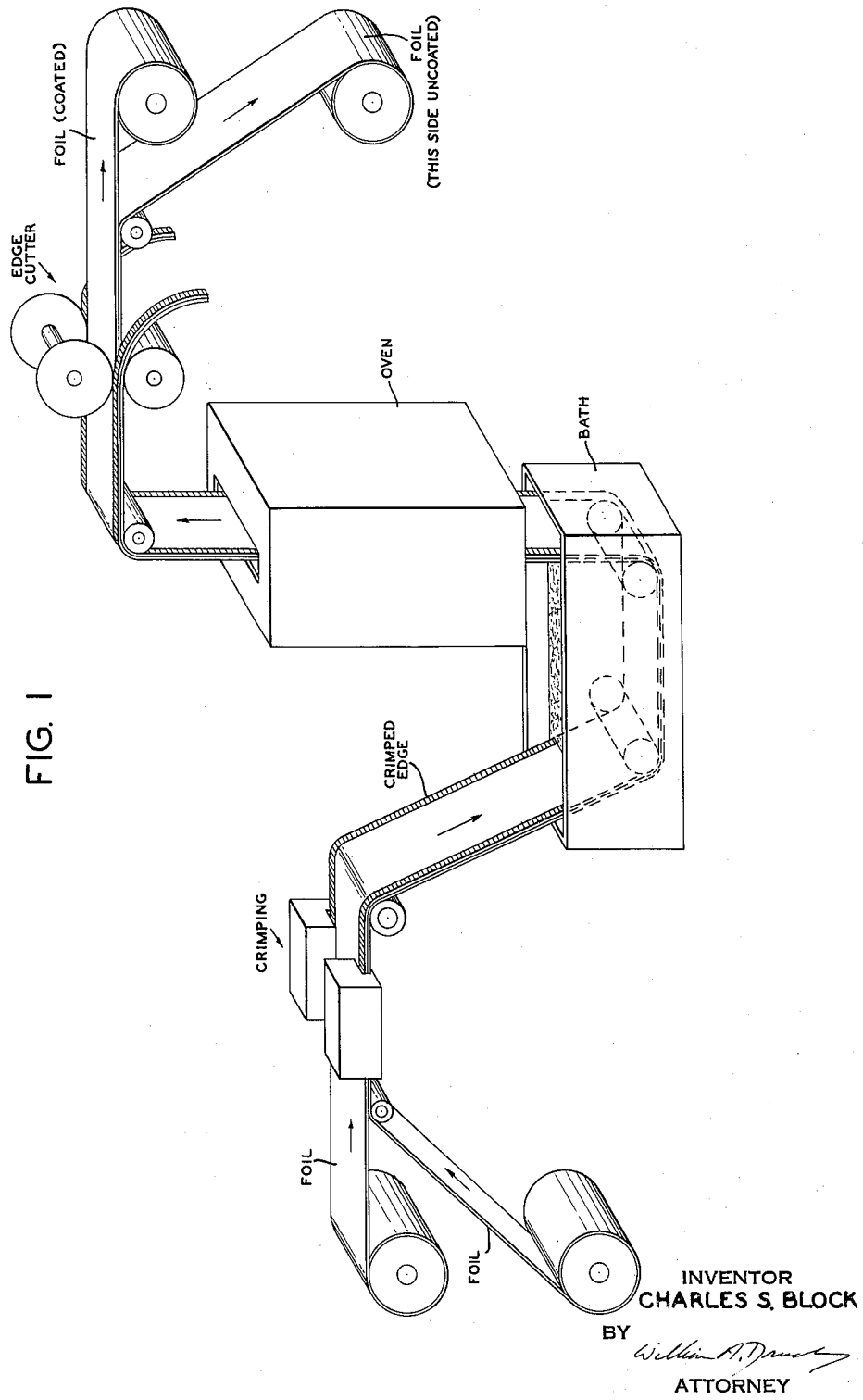

2,991,550
METAL FOIL COATED WITH DIELECTRIC MATERIAL AND METHOD OF FORMING
Charles S. Block, Stamford, Conn., assignor to American Machine & Foundry Company, a corporation of New Jersey
Filed May 25, 1956, Ser. No. 587,347
1 Claim. (Cl. 29—529)

This invention relates to metal foil coated with dielectric material and to methods of forming dielectric coated metal foil. More particularly, the invention relates to very thin aluminum foil coated with polyfluoroethylene, to electrical components made from coated aluminum foil and to methods of coating aluminum foil with polyfluoroethylene as well as methods of forming electrical components from aluminum foil coated with polyfluoroethylene.

The electronic apparatus industry often has the problem of manufacturing complex systems of components such as capacitors and printed circuits which must be fitted into the smallest possible space and perform at temperatures in excess of 200° C. These stringent specifications are particularly important in the manufacture of aircraft and missile electronic systems for military purposes but are also significant in a growing number of civilian applications where compact apparatus must operate at high temperatures.

The urgency of manufacturing high temperature electronic components for military needs has greatly intensified research on suitable materials of construction. Many novel materials of construction have been produced for this purpose, such as mineral fiber reinforced plastic films, cast and skived films of high temperature stable plastics and various conducting elements to which these films have been applied and adhered. Much of the development effort has been directed to the production of extremely thin sheet materials, characterized not only by physical stability at high operating temperatures but also by physical strength and high dielectric properties.

Plastics of low thermal stability, but having good dielectric properties, have been coated on conducting materials for a long time, and indeed various combinations of foil and polyfluoroethylene have been proposed. For example, skived fluorocarbon sheets have been applied to foil, metal has been vacuum deposited upon fluorocarbon sheet and by means of various undercoatings and primer coatings a secondary layer of fluorocarbon has been attached indirectly to metal surfaces. Spray coating of thick metal sheets wherein plastic is fused by an impinging flame has also been tried.

All of these cumbrous methods have been unsatisfactory in some respect and a need has become apparent for a simple direct method of producing a foil coated simply with a thin flexible fluorocarbon film which is so strongly bonded that it cannot peel away.

Aluminum has been used for many years as a conducting material in the manufacture of electronic components. Aluminum foil is often used as a conducting element in capacitors and its use as a conductor of electricity is well known. Aluminum has, aside from satisfactory conducting properties, four particularly valuable characteristics as a material for the fabrication of electronic components: firstly, because of the thin layer of oxide formed on its surface, it does not corrode or oxidize excessively; secondly, it has unusual strength for its weight and this is of great importance when light weight apparatus is used in aircraft, for example; thirdly, it is nonmagnetic; and finally, it is sufficiently malleable to be drawn as wire or rolled into very thin foils which are, of course, flexible.

Polyfluoroethylenes, and particularly polytetrafluoroethylene and trifluorochloroethylene, are widely used as dielectric materials, both because of unusual chemical inertness and physical stability at elevated temperatures. In many respects they appear to be an ideal solution to insulating problems but unhappily are relatively difficult to fabricate into electronic components. The difficulties of fabrication inhere in the unusual chemical and physical stability. Indeed, by various treatments coatings have ben formed directly on wires, but heretofore there has been no satisfactory direct method of coating a foil surface with these materials since spray coating has not given an electrically uniform coating.

It is therefore an object of this invention to provide an aluminum foil coated directly with polyfluoroethylene.

It is also an object of the invention to provide a method of forming an aluminum foil coated directly with polyfluoroethylene.

It is a further object of this invention to provide electronic components of aluminum foil coated directly with polyfluoroethylene.

These and other objects of the invention are described in the following specification and are illustrated in the accompanying drawing of which:

FIGURE 1 is a schematic perspective view of apparatus for coating foil on only one side with dielectric material;

FIGURE 2 is a cross-sectional schematic view of apparatus for coating foil with dielectric material;

FIGURE 3 is a cross-sectional schematic view of apparatus for producing a laminated sheet material comprising multiple layers of foil coated with dielectric material;

FIGURE 4 is a partial cross-sectional view of a sheet of foil coated on both surfaces with dielectric material as produced, for example, in apparatus similar to that illustrated by FIGURE 2;

FIGURE 5 is a partial cross-sectional view of a laminated foil as produced by apparatus shown in FIGURE 3.

According to this invention aluminum foil is dip coated in an aqueous dispersion of polytetrafluoroethylene particles and a small amount of wetting agent. When trifluorochloroethylene is used a non-aqueous dispersion is satisfactory. In order to produce a coating of uniform dielectric properties, the aluminum surface to be coated is substantially free of the oil film usually associated with the foil in the course of manufacture.

In a preferred example of a coating dispersion the particle size of dispersed polytetrafluoroethylene ranged from less than 0.06 micron diameter to about 0.4 micron diameter, and most of the particles were about 0.2 micron diameter.

The wetting agent ranged from six to about twelve percent by weight of the dry polytetrafluoroethylene. Various synthetic organic surface active agents help to keep the coating material dispersed and to promote the coating of the aluminum surface. A preferred type of wetting agent is an alkyl aryl polyether alcohol such as the Rohm & Haas Company preparation "Triton X–100." The particular wetting agent selected and its concentration is considered to be critical in so far as it affects viscosity of the coating bath. It must in any case burn out substantially completely during the fusion operation.

In general, two operations which characterize this invention are first passing a metal foil through a coating bath and subsequently passing the coated foil through a fusion zone where liquid is evaporated and wetting agent is destroyed in the course of fusing the substantially pure polyfluoroethylene particles into a continuous coating.

The thickness of the coating applied in the dipping operation is related to the speed at which the foil is removed from the coating bath as well as the concentration of coating agent and the bath viscosity. Faster speeds tend to form thicker coatings. Thickness of the fused coating may range between 0.03 to 1.0 mil. While foil might be coated by a spray mechanism, the dip coating method gives a smooth coating of unexpectedly more uniform dielectric properties.

The temperature at which the coating is fused is also related to the rate at which foil passes through the fusion apparatus. It may be as low as 327° C. when exposure lasts about four minutes, but is generally higher at a faster production rate.

Although the invention is applicable to individual foil segments, it is considered most valuable when applied to a continuous coating process wherein rolls of aluminum foil are fed through coating and fusing apparatus and then into fabricating machinery for the manufacture of electronic components such as capacitors.

Convenient foil widths range from narrow filaments to sheets about 40" wide which are subsequently slit to desired size. Foil thickness may range from about 0.17 mil to relatively heavy sheet of about 5 mils. The thinner foils are, of course, easily handled in relatively long rolls and have an inherent advantage in the manufacture of compact components. Thicker foils will carry greater current densities and when coated on only one surface can be applied as facing on various corrosion or adhesion resisting surfaces such as lining for chemical apparatus or as metal to metal laminates on bakery equipment such as dough rollers.

A feature of this invention is the production of foil coated on only one surface with dielectric material. FIGURE 1 of the drawing illustrates apparatus for producing continuous foil coated on only one side. Oil free aluminum foil from a first roll is applied to similar foil from a second roll having about the same width, and a double thickness is fed through an edge sealing device which crimps the two layers together and thereby forms a barrier which prevents coating material from seeping between the sheets when they are next immersed in the coating bath. From the coating bath the continuous double foil is carried through an oven or equivalent fusion zone where elevated temperature drives away moisture and wetting agent and fuses or sinters the dielectric material. The double sheet, coated on the external surfaces only next goes through an edge cutting device and is separated into two rolls of single sheet, each of which is coated on only one surface.

Another feature of this invention is the manufacture of aluminum foil coated on both surfaces with polyfluoroethylene. FIGURE 2 of the drawing illustrates apparatus for producing continuous foil coated on both surfaces. Continuous oil free aluminum foil is fed from a roll through a coating bath containing, for example, a selected concentration of an aqueous dispersion of polytetrafluoroethylene and a dispersing and wetting agent, and then through a fusion zone to a take-up reel. The composition of the coating bath varies from 3% to 60% solid material by weight. The higher concentrations give thicker coatings at a selected speed. A segment of the coated foil is shown in cross section by FIGURE 4.

It is believed that in the course of heat treatment individual polytetrafluoroethylene particles are fused or sintered into a continuous film. A general softening of the resin occurs at about 300° C. which as heating is continued at slightly higher temperatures results in the cohesion of the separate particles at their softened surfaces. An impinging flame might be used to fuse the coating, but would adversely affect the mechanical properties such as temper and ductility of thin foil, whereas heat treatment in an oven type mechanism is more easily and evenly controlled.

In the manufacture of electronic components from aluminum foil coated with polyfluoroethylene it is important to maintain a high degree of dielectric uniformity between parallel foil elements. Even the best coating methods leave occasional areas of dielectric irregularity, and this invention includes a provision whereby such irregularities are avoided.

It has been discovered that when two or more parallel coated foils are pressed together with the coated surfaces in contacting relationship, it is possible to bond the foils into a composite sheet which has better dielectric properties than two single sheets combined. To explain this unexpected result it is postulated that irregular areas of dielectric weakness on one coated foil are overlapped and cancelled by regular areas of the other foil and a continuous dielectric region is created between the foils. Moreover, the coated faces of the two foil sheets adhere to one another so tightly that they cannot be easily peeled apart and constitute a capacitor.

This article which is superior to a mere double thickness of foil is readily fabricated into conventional capacitors. When individual foil elements carry printed or etched circuitry, they are easily coated with polyfluoroethylene and laminated to form a compact circuit subassembly.

The lamination of polyfluoroethylene coated aluminum foil sheets can be carried out with apparatus similar to that illustrated by FIGURE 3. Two or more rolls of foil are fed simultaneously through two or more calender rolls. Paper (for example kraft paper) is fed through the rolls between the roll faces and the foil at the same time, both to distribute pressure evenly and to prevent irregularities such as wrinkles from forming in the foil. The laminated product is shown in FIGURE 5.

In order to prevent current leakage around the edge of the laminated material, the metal may be dissolved from the edge a short distance so that there is a protrusion of dielectric coating before or after lamination is carried out. This is conveniently done by the application of caustic solution. To form a capacitor a pair of staggered foil strips may also be rolled together according to conventional capacitor manufacturing methods. When a capacitor is made by this method, the etched foil edges are effectively separated from each other and arcing is avoided.

There have thus been described novel coated foils and electrical components made from coated foil as well as methods of forming both the foil coatings and the electrical components.

What is claimed is:

The method of coating metal foil on only one surface with a fused material which comprises in combination the steps of applying a first sheet of metal foil upon a second sheet of metal foil of similar lateral dimensions, crimping together the edges of said foil sheets to form a composite sheet and to prevent entry of liquid between the first and second sheets, dip coating said composite sheet to simultaneously wet both surfaces in a liquid containing a fusible material, fusing the material upon said surfaces, and separating the first sheet of foil from the second sheet of foil.

References Cited in the file of this patent

UNITED STATES PATENTS

| | | |
|---|---|---|
| 2,268,673 | Reynolds | Jan. 6, 1942 |
| 2,392,388 | Joyce | Jan. 8, 1946 |
| 2,484,484 | Berry | Oct. 11, 1949 |
| 2,520,173 | Sanders | Aug. 29, 1950 |
| 2,528,168 | Paulsen | Oct. 31, 1950 |
| 2,562,117 | Osdal | July 24, 1951 |
| 2,686,767 | Green | Aug. 17, 1954 |
| 2,709,146 | Berry et al. | May 24, 1955 |